US008923128B2

(12) United States Patent
Wigell

(10) Patent No.: US 8,923,128 B2
(45) Date of Patent: Dec. 30, 2014

(54) METHOD AND ARRANGEMENT FOR DETECTING CONGESTION IN A COMMUNICATIONS NETWORK

(75) Inventor: Toomas Wigell, Espoo (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 184 days.

(21) Appl. No.: 13/703,777

(22) PCT Filed: Jun. 22, 2010

(86) PCT No.: PCT/SE2010/050709
§ 371 (c)(1),
(2), (4) Date: Dec. 12, 2012

(87) PCT Pub. No.: WO2011/162650
PCT Pub. Date: Dec. 29, 2011

(65) Prior Publication Data
US 2013/0083656 A1 Apr. 4, 2013

(51) Int. Cl.
*H04L 12/26* (2006.01)
*H04L 12/801* (2013.01)
*H04L 12/841* (2013.01)
*H04L 12/825* (2013.01)

(52) U.S. Cl.
CPC ............... *H04L 47/25* (2013.01); *H04L 47/12* (2013.01); *H04L 47/283* (2013.01); *H04L 43/087* (2013.01); *H04L 47/263* (2013.01); *Y02B 60/31* (2013.01); *H04L 47/14* (2013.01)
USPC ......................................... 370/235; 370/252

(58) Field of Classification Search
None
See application file for complete search history.

(56) References Cited

U.S. PATENT DOCUMENTS

| 8,588,071 | B2 * | 11/2013 | Mahkonen | ............... 370/235 |
| 2002/0154653 | A1 | 10/2002 | Benveniste | |
| 2002/0163933 | A1 | 11/2002 | Benveniste | |
| 2007/0263664 | A1 | 11/2007 | Yang | |

OTHER PUBLICATIONS

Floyd, S. and Kohler, E. "Profile for Datagram Congestion Control Protocol (DCCP) Congestion Control ID 2: TCP-like Congestion Control," Internet Engineering Task Force, RFC 4341, Mar. 2006, pp. 1-18.
Handley, M. et al. "TCP Friendly Rate Control (TFRC): Protocol Specification," Internet Engineering Task Force, RFC 3448, Jan. 2003, pp. 1-21.

* cited by examiner

*Primary Examiner* — Rhonda Murphy
(74) *Attorney, Agent, or Firm* — Murphy Bilak & Homiller, PLLC

(57) ABSTRACT

The invention relates to a method and arrangement for detecting congestion in a communications network (120). A receiving node (130) receives (710) data packets from a sending node (110) over a communications link (140). First and second parts (320, 330) of a frequency spectrum (310) of a time delay of the data packets are determined (720). The first part comprises non-congestion related low frequency components. The second part comprises congestion related and non-congestion related low frequency components when a load level of the communications network is above a threshold value (220) but substantially no congestion related low frequency components when the load level is below the threshold value. Then reference jitter level ($y_r$) and congestion jitter level ($y_g$) corresponding to the first and second parts respectively are estimated (740). Finally, congestion state information is determined (750) by comparing said congestion jitter level to said reference jitter level.

18 Claims, 9 Drawing Sheets

METHOD AND ARRANGEMENT FOR DETECTING CONGESTION IN A COMMUNICATIONS NETWORK

TECHNICAL FIELD

The invention relates generally to a method and an arrangement in a receiving node in a communications network. In particular it relates to detecting congestion in the communications network.

BACKGROUND

In a digital packet-switched communications network different types of traffic, e.g. voice, data, audio and video, may be conveyed between multiple parties via shared resources, e.g. routers or transmission channels. Some traffic, such as many audio and video applications, typically occurs in real time, whereas other traffic, such as many data applications, typically is not in real time. The traffic generated by different types of applications may be data packets that are transmitted from sending nodes to receiving nodes in sessions that may be set up over communication links or connection paths through the communications network.

When the traffic load in the communications network gets too high, congestion may occur. Congestion means that the data packets are sent by the sender or sending node faster than the packets can be transferred on the connection path to the receiver or receiving node. Congestion can have multiple causes. For example radio link level congestion may be caused by too high traffic load in the cell, whereas transport network link congestion may be caused by too high load on a particular link in the transport network. Congestion can also occur when a user equipment (UE) moves towards the cell edge and becomes coverage limited.

As a consequence of the congestion, the packet queue length in the buffer of a sending node that sends packets on a congested communications link starts increasing which may lead to packet drops when the buffer's maximum queue length is reached or when the queuing time in the buffer exceeds a certain limit.

To alleviate the congestion, congestion control mechanisms may be employed to control the rate of rate adaptive sources or applications based on congestion indications. The congestion control mechanisms control the rate adaptive sources or applications so that they drop or reduce the rate at which packets are sent during congestion and restore the rate when the congestion is over. A congestion indication can be based on measurements of queuing delay of packets in a congested node or resource. The congestion may then be indicated to the receiver or receiving node by means of special signaling like Explicit Congestion Notification (ECN) bits in the Internet Protocol (IP) header of the data packets. Alternatively, congestion may be detected at the receiver or receiving node based on jitter level. Congestion may also be detected based on packet loss, but using packet loss as the main source for detecting congestion may not be acceptable for real-time media applications like voice and video, as these applications are delay-sensitive and also quite sensitive to packet loss. There is then a risk that the application has already stopped working when congestion is detected.

There are not many widely agreed upon and standardized congestion control algorithms. Besides congestion control algorithms intended for Transmission Control Protocol (TCP), the most known algorithms are TCP-like congestion control algorithms, specified for Datagram Congestion Control Protocol (DCCP) in Internet Engineering Task Force (IETF) Request for Comments (RFC) 4341, and TCP-friendly Rate Control, specified in IETF RFC 3448.

TCP uses an Additive Increase Multiplicative Decrease (AIMD) algorithm where a length of a congestion window is used for congestion control. The length specifies a maximum number of packets, or segments of packets, that may be sent by a TCP sender or sending node without receiving feedback from the TCP receiver or receiving node. At congestion the AIMD algorithm applies a decrease-to-half strategy, wherein the length of the congestion window is reduced to half its original size. After that congestion has occurred an increase-by-one strategy is applied, wherein the length of the congestion window is increased by one packet at a time until the length of the window is restored.

As a general principle, the TCP-friendly Rate Control algorithms model the TCP congestion control behavior so that they are TCP-friendly on a longer term but behave differently on a short term. Usually the intention is to smooth the rate change intensity or steps at which the rate is changed for applications that need a rate change at an even pace for their performance. This is because the TCP congestion window only sets a maximum limit for the number of packets that may be sent without receiving feedback, but it does not specify a target rate at which the packets should be sent by the sender or sending node.

Unfortunately, the TCP-friendly Rate Control algorithms emphasize packet loss as a main source for detecting congestion. As a result, these algorithms allow quite high packet loss during congestion. Such a behavior is not suitable for real-time media applications such as voice and video applications. Additionally, the origin of the packet loss might not be congestion but a non-congestive packet loss caused by bad quality, e.g. of a radio link.

The working principle of real-time friendly congestion control algorithms resembles the working principle of TCP or TCP-friendly algorithms; but instead of using packet loss as an indicator for detecting congestion they are using "soft" congestion indicators such as packet jitter or ECN indication triggered by queuing delay as earlier described.

The real-time friendly congestion control mechanisms usually incur fast rate drop or reduction when congestion is indicated and slow rate increase when the congestion is over. The rate is dropped or reduced fast when congestion is indicated or detected in order to avoid packet loss. Implementation of fast rate drop is quite straight forward and there are many proposed solutions on how to do that in an adaptive way. How to increase the rate when the congestion ceases is more problematic.

A problem is how to determine when there is room for increasing the rate again. Increasing the rate too much too early will cause oscillations in rate, as the rate may then have to be dropped again due to that the congestion has not yet ceased. To alleviate the oscillation during congestion the rate should be increased very slowly.

However, if the rate is increased slowly during a longer period than necessary the link utilization will not be efficient and the time until good connection quality is restored after that the congestion is over will be longer than necessary. Therefore, the rate increase should be fast when the congestion ceases. Conventional congestion control mechanisms therefore typically increase the rate with constant or close to constant speed, where the speed of the rate increase is set as a compromise between these different requirements.

This means that, with existing congestion control mechanisms, either the rate oscillations during congestion are quite high, which reduces the connection quality, or the rate is increased too slowly after that the congestion is over, which means that the available link capacity is not fully utilized and the delay until good connection quality is restored is unnecessarily long. Thus, it is a problem that an application that is running in a session between a sending node and a receiving node cannot know in advance whether to increase the rate at a slow pace or at a fast pace.

SUMMARY

It is therefore an object according to at least some of the embodiments of the present disclosure to provide an improved mechanism for determining whether a network is in a congestion state or not.

An additional object according to further embodiments is to enable rate adaptation to be performed in a proactive way.

According to a first embodiment of the present invention, these objects are achieved by a method in a receiving node 130 for detecting congestion in a communications network 120. The receiving node 130 is adapted to be connected to the communications network 120. The receiving node 130 receives 710 data packets from a sending node 110. The data packets are transmitted in a session over a communications link 140 through the communications network 120. The data packets arrive at the receiving node 130 with a time delay. The time delay has a frequency spectrum 310 that is dependent on a load level 210 of the communications network 120.

The receiving node 130 determines 720 a first part 320 of the frequency spectrum 310. The first part 320 is limited upwards by a lower frequency limit $f_{low}$, so that the first part 320 of the frequency spectrum 310 comprises non-congestion related low frequency components but substantially no congestion related low frequency components. The receiving node 130 then determines 730 a second part 330 of the frequency spectrum 310 that is limited upwards by an upper frequency limit $f_{high}$.

The second part 330 is determined so that, when the load level 210 of the communications network 120 is below a threshold value 220, the second part 330 of the frequency spectrum 310 comprises non-congestion related low frequency components, but substantially no congestion related low frequency components. It is further determined so that, when the load level 210 of the communications network 120 is above the threshold value 220, the second part 330 of the frequency spectrum 310 comprises non-congestion related low frequency components and congestion related low frequency components.

The receiving node 130 further estimates 740 a reference jitter level $y_r$ corresponding to the first part 320 of the frequency spectrum 310 and a congestion jitter level $y_g$ corresponding to the second part 330 of the frequency spectrum 310. The receiving node 130 then determines 750 congestion state information of said communications network 120 by comparing said congestion jitter level $y_g$ to said reference jitter level $y_r$.

According to a second embodiment of the present invention, the objects are achieved by an arrangement 900 in a receiving node 130 that is adapted to detect congestion in a communications network 120. The receiving node 130 is adapted to be connected to the communications network 120.

The arrangement 900 comprises a receiving unit 910 that is adapted to receive data packets from the sending node 110 through the communications network 120. The data packets are transmitted in the session over the communications link 140. The data packets arrive at the receiving node 130 with a time delay. The frequency spectrum 310 of the time delay depends on the load level 210 of the communications network 120.

The arrangement 900 further comprises a frequency spectrum determining unit 920 that is connected to the receiving unit 910 and adapted to determine the first part 320 of the frequency spectrum 310. The first part 320 of the frequency spectrum 310 is limited upwards by the lower frequency limit $f_{low}$, so that the first part 320 of the frequency spectrum 310 comprises non-congestion related low frequency components but substantially no congestion related low frequency components.

The frequency spectrum determining unit 920 is further adapted to determine the second part 330 of the frequency spectrum 310 that is limited upwards by the upper frequency limit $f_{high}$. The second part 330 is determined so that, when the load level 210 of the communications network 120 is below the threshold value 220, the second part 330 of the frequency spectrum 310 comprises non-congestion related low frequency components, but substantially no congestion related low frequency components. It is further determined so that, when the load level 210 of the communications network 120 is above the threshold value 220, the second part 330 of the frequency spectrum 310 comprises non-congestion related low frequency components and congestion related low frequency components.

The arrangement 900 further comprises an estimating unit 930 that is connected to the frequency spectrum determining unit 920 and adapted to estimate the reference jitter level $y_r$ corresponding to the first part 320 of the frequency spectrum 310 and the congestion jitter level $y_g$ corresponding to the second part 330 of the frequency spectrum 310.

The arrangement 900 further comprises a congestion state determining unit 940 that is connected to the frequency spectrum determining unit 920 and adapted to determine congestion state information of said communications network 120 by comparison of the congestion jitter level $y_g$ to the reference jitter level $y_r$.

Since congestion state information, i.e. whether the communications network 120 is in a congestion state or a non-congestion state, may thus be determined by comparing the congestion jitter level $y_g$ to the reference jitter level $y_r$, the first object of the present disclosure is achieved in that an improved mechanism for determining whether a network is in a congestion state or not is provided.

Further, the additional object according to further embodiments is achieved in that rate adaptation can be performed in a proactive way by comparing the congestion jitter level $y_g$ to the reference jitter level $y_r$ to determine congestion state information in order to determine how to adapt the rate in a session.

An advantage of at least some of the embodiments of the present invention is that the connection quality in the session is improved during congestion due to smaller rate oscillation level and lower oscillation frequency.

A further advantage of the present invention is that the connection quality and/or rate is restored faster after that congestion is over as it is possible to determine when higher link capacity becomes available.

BRIEF DESCRIPTION OF THE DRAWINGS

The embodiments of the invention, together with further objects and advantages thereof, may be more readily understood by making reference to the following description taken together with the accompanying drawings, in which.

DETAILED DESCRIPTION

Figure 1A:
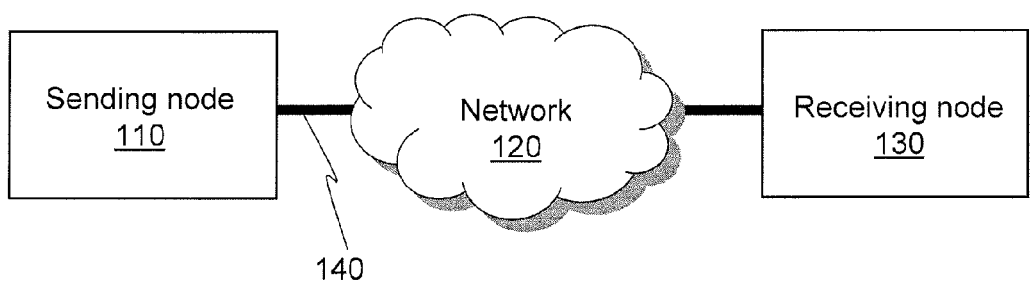
FIG. 1A is a schematic block diagram illustrating sending and receiving nodes in a communications network.

According to at least some of the embodiments of the present disclosure solutions for detecting congestion in a communications network are provided. A session has been set up over a communications link between a sending node and a receiving node that are connected to the communications network. The sending node transmits data packets in the session to the receiving node. The data packets arrive at the receiving node with a time delay that varies for different packets. The time delay may be represented as a signal that varies with time and that has a frequency spectrum that may be analyzed in a digital spectrum analyzer.

The inventor has realized that it is possible to determine a frequency band in the lower part of the frequency spectrum where the level of frequency components increases when the communications network is overloaded or congested as compared to when the communications network is not overloaded or congested. Further, it is possible to determine another frequency band in the lower part of the frequency spectrum, where the level or amplitude of frequency components is about the same when the communications network is over-loaded or congested as when it is not overloaded or congested. The inventor has then concluded that by forming a congestion measure that reflects the level or amplitude of frequency components in the frequency band where the level of frequency components increases and a reference measure that reflects the level of frequency components in the frequency band where the level of frequency components is about the same, it is possible to determine whether the communications network is in a congestion state by comparing the congestion measure to the reference measure. The inventor has further realized that this determination may be used for determining when there is room for restoring the rate of an application, which is running in a session between a sending node and a receiving node, after that congestion has occurred in the communications network, for example in a shared resource along the communications link between the sending node and the receiving node.

When the communications network is not overloaded or congested, the frequency bands comprise non-congestion related frequency components, but substantially no congestion related frequency components. The amount or level of congestion related frequency components in the respective frequency bands may for example be below 25% of the total amount or level of frequency components in the respective frequency band in this case.

When the communications network is overloaded or congested, the frequency band where the level of frequency components increases comprises congestion related and non-congestion related frequency components whereas the frequency band where the level of frequency components is about the same comprises non-congestion related frequency components, but substantially no congestion related frequency components. The amount or level of congestion related frequency components in the frequency band where the level of frequency components is about the same may then for example be below 25% of the total amount or level of frequency components in that frequency band.

Non-congestion related frequency components are caused by non-congestion related time delay of the data packets, whereas congestion related frequency components are caused by congestion related time delay of the data packets.

The embodiments of the invention will now be described with reference to FIG. 1A for a jitter based congestion control and/or load adaptation mechanism. The embodiments of the present disclosure are however not limited to this context. To the contrary, similar principles can be applied also for other load adaptation methods and algorithms, e.g. packet loss based congestion control methods and algorithms. Further, although embodiments and examples presented in this disclosure have been prepared using jitter or delay variation as an input variable for computations and other processing steps, the principles are also applicable in an environment where for example the time delay is used as the input variable.

The term jitter used in this disclosure is to be understood as the variation in time delay, also denoted delay variation, between different data packets that arrive at the receiving node. The jitter or delay variation may according to different embodiments of the present disclosure be measured relative to a fixed delay, which corresponds to a zero-frequency component, i.e. a Direct Current (DC) component. The delay variation may be formed by subtracting the fixed delay from the time delay.

Figure 1B:
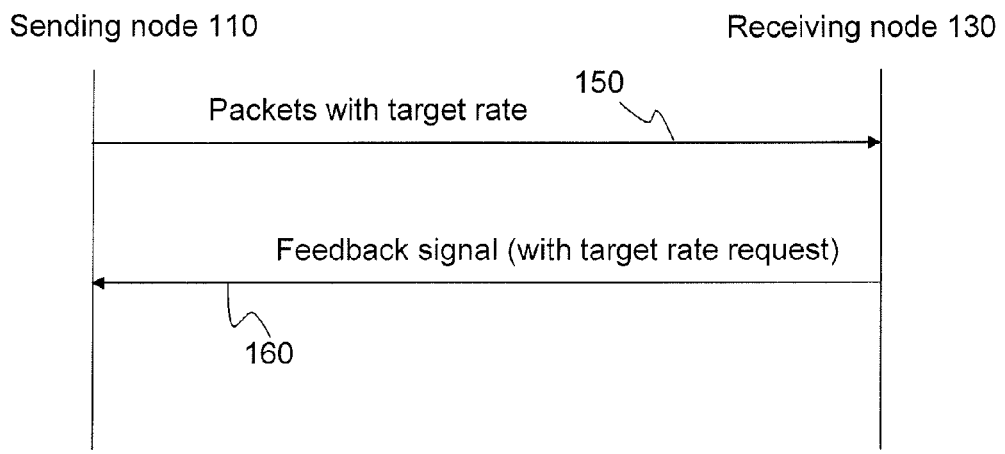
FIG. 1B is a signalling diagram illustrating a communication between sending and receiving nodes in a communications network.

FIG. 1A depicts a communications network 120, to which a sending node 110 and a receiving node 130 are connected via a communications link 140. The sending node 110 transmits in signal 150 data packets at a current target rate to the receiving node 130 as depicted in a signalling diagram for the transmission of data packets in FIG. 1B. The data packets are transmitted in a session that has been set up over the communications link 140 between the sending node 110 and the receiving node 130. The sending and receiving nodes 110, 130 may be running an application in the session and the data packets may pertain to the application. The application may in some embodiments be a real-time media application, such as a voice or video application.

The data packets arrive at the receiving node 130 with a time delay that varies for different packets. The receiving node 130 measures the time delay and calculates a requested target rate based on delay, packet loss and congestion state. The receiving node 130 then sends a feedback signal 160 in response to the reception of a data packet or a group of data packets including a target rate request in the feedback signal 160. The target rate request may specify a requested target rate that is higher or lower than the current target rate, depending on the measured time delay. The sending node 110 adapts the current target rate according to the target rate request from the receiving node 130.

The time delay depends on the load level of the communications network 120, for example the load level in a shared resource along the communications link 140 between the sending node 110 and the receiving node 130. The load level in the shared resource may be generated by a plurality of sessions that have been set up for communication via the shared resource.

Figure 2A:
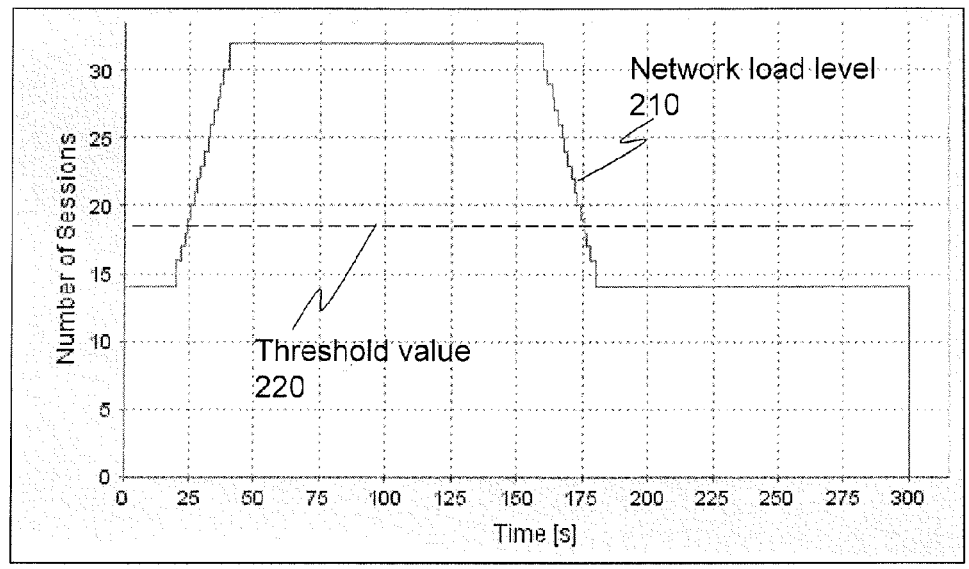
FIG. 2A is a diagram illustrating a network load level.

FIG. 2A shows an example of the load level 210 of the communications network 120 in terms of how the number of sessions, e.g. in the shared resource, varies with time. As long as the load level 210 is below a threshold value 220, the communications network 120 is under-loaded and thus in a non-congestion state. When the load level 210 increases above the threshold value 220, the communications network 120 has become over-loaded and thus congestion may occur. The communications network 120 enters a congestion state.

The communications network 120 is over-loaded when the total mean rate of all the sessions running via a resource, such as the shared resource in this example, is greater than the bandwidth of the resource. Similarly, the communications network 120 is under-loaded when the total mean rate of all the sessions running via the resource, such as the shared resource in this example, is less than the bandwidth of the resource.

The time delay comprises a fixed delay part and a dynamically changing delay part, known as delay variation or jitter. The jitter comprises different frequency components of different levels or amplitudes. High-frequency components are less dangerous because their amplitude is usually not very large and they can be compensated by de-jittering buffers or play-out buffers. The low frequency components of the jitter, however, may comprise high spikes that last over considerable time periods, e.g. several seconds, and will usually not be compensated by the de-jittering buffers.

Low frequency delay spikes or the beginning of a spike may be an indication that packets of a particular flow are stuck in a buffer along the connection path, for example in the shared resource along the communications link 140. Other reasons can be beginning of congestion on a bottleneck link or bad quality of a particular radio link connection. In these cases a congestion control mechanism can, if the condition is detected early enough, prevent that congestion occurs, or at least reduce the effects of the congestion, by incurring that the involved applications reduce their rate substantially, e.g. by 50%.

Figure 2B:
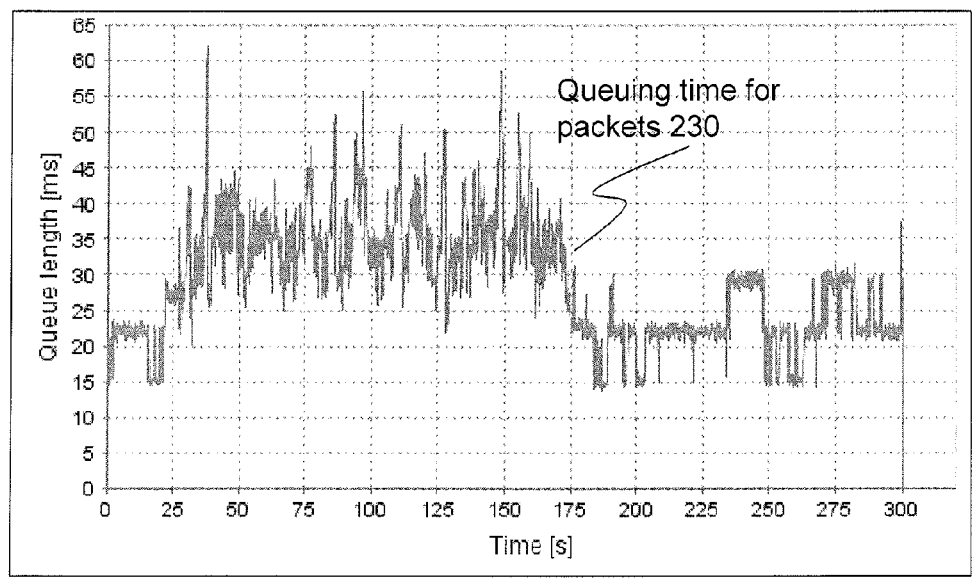
FIG. 2B is a diagram illustrating an example of delay variation or jitter.

FIG. 2B shows an example of time delay represented as queue length in time 230 in a network buffer corresponding to the load level 210 of the communications network 120 as shown in FIG. 2A. The queue length in time shows how long time different data packets have to wait in a queue in the network buffer, for example in the shared resource in the communications network 140. The queuing time 230 in the network buffer increases when the load level 210 in the communications network 120 increases.

As mentioned above, the inventor has realized that if the congestion related information, i.e. congestion related frequency components, could be separated from the non-congestion related information, i.e. non-congestion related frequency components, in the signal representations of the time delay or delay variation, i.e. jitter, it would be possible to use the congestion related information as an indication of congestion. The inventor has further concluded that the congestion related information should be found in the lower frequency region of the jitter, whereas the higher frequency part in general can be expected to comprise non-congestion related information. This is because when congestion occurs, the congestion can be expected to contribute to the time delay of each packet in a similar way during a comparably long time period.

Figure 3A:
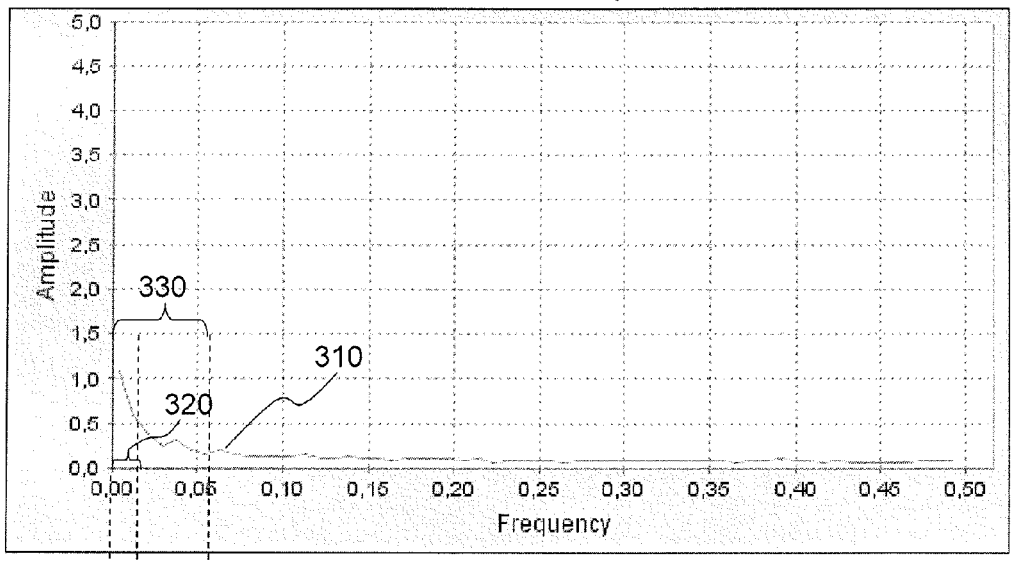
FIG. 3A is a diagram illustrating examples of delay frequency spectra for under-loaded and over-loaded scenarios in a system without re-transmissions of packets.
Figure 3A:
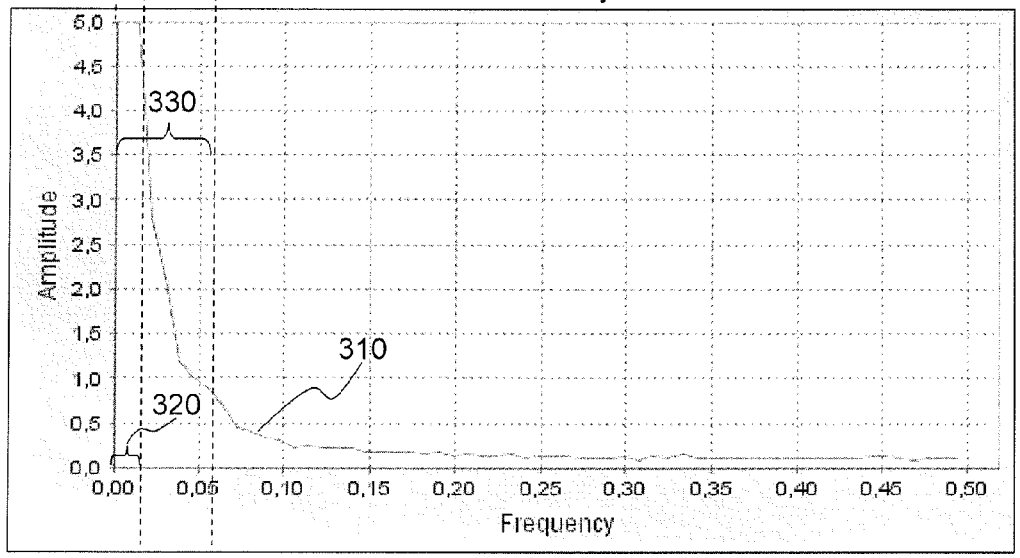

In FIG. 3A the frequency spectra 310 of the jitter or delay variation at the receiving node 130 for under-loaded and over-loaded scenarios in the communications network 120 are shown. The graphs have been produced by applying a Discrete Fourier Transform (FT) to the jitter at the receiving node 130. In the scenarios shown in FIG. 3A, no re-transmissions occur in the communications network 120.

Figure 3B:
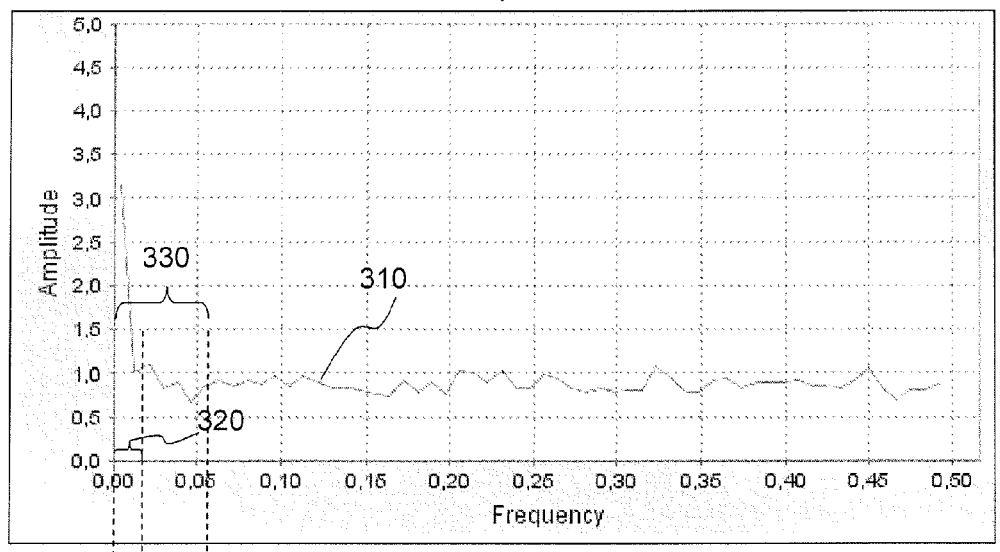
FIG. 3B is a diagram illustrating examples of delay frequency spectra for under-loaded and over-loaded scenarios in a system with re-transmissions of packets.
Figure 3B:
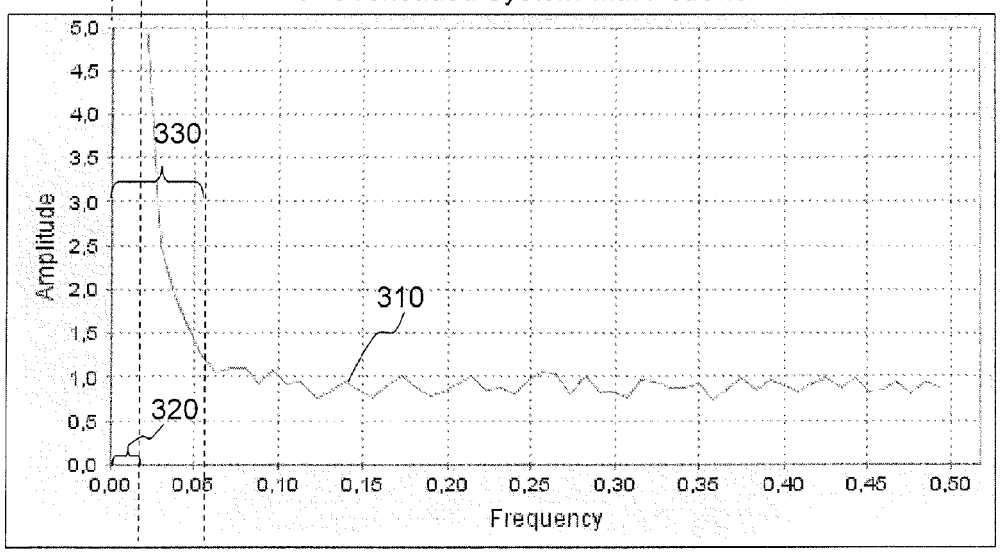

As a comparison, to illustrate the impact of non-congestion based jitter, for example re-transmissions on radio interface, an additional random, uniformly distributed, jitter with values 0, 20, and 40 ms has been generated. In FIG. 3B the frequency spectra 310 of the jitter or delay variation at the receiving node 130 for under-loaded and over-loaded scenarios with re-transmissions in the communications network 120 are shown. The graphs have been produced by applying a Discrete Fourier Transform (FT) to the jitter at the receiving node 130.

In FIGS. 3A and 3B the horizontal axis is labeled as a fraction of the sampling rate or arrival rate of the packets. Due to the sampling theorem, only values between 0, i.e. a DC component, and 0.5, i.e. one-half of sampling frequency, are valid. The zero-frequency component or DC component, which represents the fixed delay level or amplitude, has been left out. The curves 310 have been slightly smoothed, by calculating a mean value over a sliding window of 10 samples, to remove amplitude fluctuation between adjacent frequencies in order to improve the readability of the diagrams.

The frequency region above an upper frequency limit $f_{high}$ comprises non-congestion related jitter components. This can be seen from that the amplitude or level 310 of frequency components in this frequency region is about the same for the over-loaded and under-loaded scenarios. Further, the difference in amplitude or level 310 of the frequency components between the under-loaded and over-loaded scenarios is much less than in the frequency region below $f_{high}$. In general frequency region above the upper frequency limit $f_{high}$ comprises stochastic jitter fluctuations and it may include jitter components caused e.g. by re-transmissions on the radio interface or by the scheduling of the flow of data packets at the sending node 110. The effect of re-transmissions can be seen by comparing the graphs 310 of FIG. 3B to the graphs 310 of FIG. 3A.

The main difference between under- and over-loaded systems can be found in the lower frequency region, below the upper frequency limit $f_{high}$, in this example at the value 0.06. In this lower frequency region the amplitude or level 310 of frequency components is higher for the over-loaded scenario than for the under-loaded scenario in communications network 120. Especially, the amplitude or level 310 of frequency components is clearly higher for the over-loaded scenario than for the under-loaded scenario in a frequency region or band between a lower frequency limit $f_{low}$, in this example at the value 0.02, and the upper frequency limit $f_{high}$. This means that this frequency region or band comprises congestion related frequency components. However, it also comprises non-congestion related frequency components, as can be seen from the under-loaded scenario in FIG. 3A. The frequency region below $f_{high}$ comprises low-frequency jitter caused by e.g. low frequency fluctuation in the arrival rate of data packets at e.g. the shared resource, where the arrival rate high level bursts may lead to over-load.

In addition to the non-congestion related high frequency region above the upper frequency limit $f_{high}$ there is also a low frequency region below the lower frequency limit $f_{low}$, in this example at the value 0.02, which comprises mainly non-congestion related frequency components This can be seen from that the amplitude or level 310 of frequency components is high for both under- and over-loaded scenarios in the communications network 120. Further, the difference in amplitude or level 310 of the frequency components between the under-loaded and over-loaded scenarios is less than in the frequency region between the lower frequency limit $f_{low}$ and the upper frequency limit $f_{high}$.

It can thus be concluded that at over-load or congestion in the communications network 120, congestion related frequency components can be expected to appear to a higher extent in a frequency region or band between the lower frequency limit $f_{low}$ and the upper frequency limit $f_{high}$ than in the frequency regions below the lower frequency limit $f_{low}$ and above the upper frequency limit $f_{high}$. Further, it can be concluded that the amplitude or level 310 of frequency components increases less in the frequency region or band below the lower frequency limit $f_{low}$ and in the frequency region above the upper frequency limit $f_{high}$ than in the frequency region or band between the lower frequency limit $f_{low}$ and the upper frequency limit $f_{high}$ when congestion occurs in the communications network 120.

Compared to the increase in amplitude or level 310 of frequency components in the frequency region or band between the lower frequency limit $f_{low}$ and the upper frequency limit $f_{high}$ the amplitude or level 310 of frequency components in the frequency region or band below the lower frequency limit $f_{low}$ and in the frequency region above the upper frequency limit $f_{high}$ may be seen to stay at about the same level although there may in fact be some increase also in these frequency regions. For example, if the increase in the amplitude or level 310 of frequency components in the frequency region or band between the lower frequency limit $f_{low}$ and the upper frequency limit $f_{high}$ is more than 75%, the increase may be less than 25% in the frequency region or band below the lower frequency limit $f_{low}$ and in the frequency region above the upper frequency limit $f_{high}$.

It is further conceived that the upper and lower frequency limits $f_{high}$ and $f_{low}$ may in this way be determined for a number of typical connections. Appropriate limits $f_{low}$ and $f_{high}$ may then be selected for a connection and applied in a congestion control mechanism according to the present disclosure after scaling the frequency limits $f_{high}$ and $f_{low}$ by the sampling rate or arrival rate applied in the connection.

In accordance with the above reasoning, and according to the embodiments of the present disclosure, a first part 320 of the frequency spectrum 310 that is limited upwards by a lower frequency limit $f_{low}$ is determined. The lower frequency limit $f_{low}$ is thereby selected so that the first part 320 of the frequency spectrum 310 comprises non-congestion related low frequency components but substantially no congestion related low frequency components.

Further, a second part 330 of the frequency spectrum 310 that is limited upwards by an upper frequency limit $f_{high}$ is determined. The upper frequency limit $f_{high}$ is thereby selected so that, when the load level 210 of the communications network 120 is below a threshold value 220, the second part 330 of the frequency spectrum 310 comprises non-congestion related low frequency components, but substantially no congestion related low frequency components. The upper frequency limit $f_{high}$ is further selected so that, when the load level 210 of the communications network 120 is above the threshold value 220, the second part 330 of the frequency spectrum 310 comprises non-congestion related low frequency components and congestion related low frequency components.

The congestion state information, i.e. whether the communications network 120 is in a congestion state or a non-congestion state, may according to embodiments of the present disclosure be determined by an algorithm that is tuned to the frequency band where the congestion most probably happens, i.e. the frequency region or band between $f_{low}$ and $f_{high}$. The upper frequency limit $f_{high}$ may here be a first fraction of a sample rate of the delay variation 430 and the lower frequency limit $f_{low}$ may be a second fraction of the sample rate of the delay variation 430. Alternatively, the upper frequency limit $f_{high}$ may be a first fraction of a sample rate of the time delay and the lower frequency limit $f_{low}$ may be a second fraction of the sample rate of the time delay.

For the determination of the congestion state information, a reference jitter level $y_r$ corresponding to the first part 320 of the frequency spectrum 310 and a congestion jitter level $y_g$ corresponding to the second part 330 of the frequency spectrum 310 may then be estimated, as will be described in more detail below with reference to FIG. 4. The estimations may be done in different ways. One possibility is to use first and second low-pass filters tuned to the $f_{low}$ and $f_{high}$ frequencies. The first low-pass filter, with very low time constant, may be used for estimating the reference jitter level $y_r$ that reflects the level of non-congestion related low frequency components in the first part 320 of the frequency spectrum 310. The second low-pass filter, with higher time constant, may be used for estimating the congestion jitter level $y_g$ that reflects the level of congestion related and non-congestion related low frequency components in the second part 330 of the frequency spectrum 310. In this case, when low-pass filtering is used, the first and second parts 320, 330 of the frequency spectrum 310 are overlapping. Another possibility would be to define the second part 330 as adjacent to the first part 320 and to use a band-pass filter with filter time constants tuned according to the frequencies $f_{low}$ and $f_{high}$ for estimating the congestion jitter level $y_g$. This would however also change the relationship between the reference jitter level $y_r$ and the congestion jitter level $y_g$.

Figure 4:
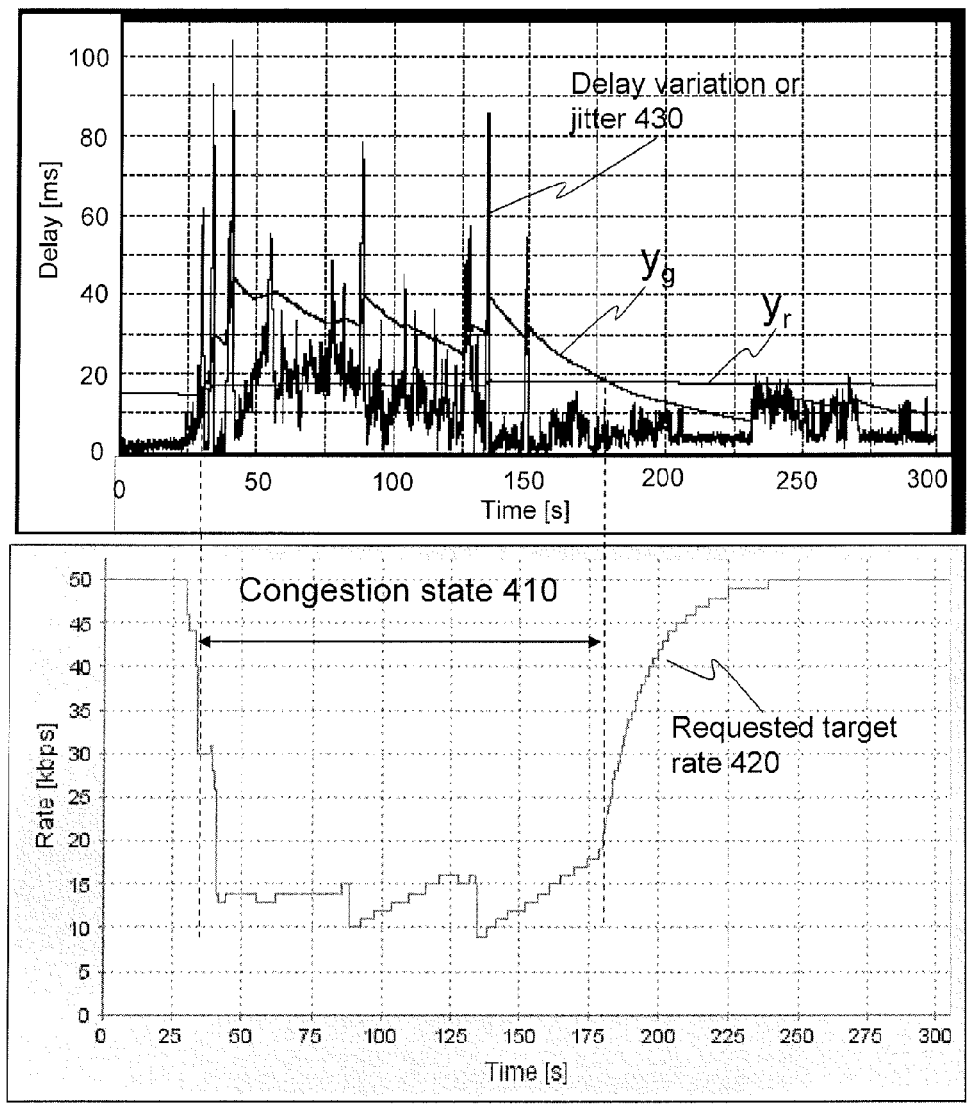
FIG. 4 is a diagram illustrating an example according to an embodiment of the disclosure.

FIG. 4 shows the delay variation or jitter part 430 of the time delay measured at the receiving node 130. Apart from higher frequency components, so-called ripple, there may also be non-congestion related low frequency components of the time delay. There might be periods during a call when the high frequency ripple is relatively small and the non-congestion related jitter level is dominated by the low frequency components.

The non-congestion related low frequency jitter component, denoted reference jitter level $y_r$, can be separated from the jitter or delay variation 430. The separation could for example be done by means of a first low-pass filter, e.g. a simple single pole recursive filter, using a first filter time constant $k_r$. The first filter time constant $k_r$ should be tuned according to the frequency $f_{low}$. The first low-pass filter should be symmetric to avoid false filtered levels in case of overload peaks.

$$y_l[i]=y_l[i-1]+k_r*(y[i]-y_l[i-1])$$

$$y_r=1.5*y_l,$$

where y[i] is the jitter or delay variation part of the time delay for packet number i, which is input to the first low-pass filter, $y_l[i-1]$ is the filter output for packet number i−1 and $y_l[i]$ is the filter output for packet number i. The first filter time constant $k_r$ is very small. An appropriate value for $k_r$ may be in the interval 0.0005 to 0.0015, and preferably about 0.001.

To get the right level of reference jitter level $y_r$, the low pass filter output $y_l$ should be multiplied with a coefficient, with a value in the interval 1.4 to 1.6 and preferably about 1.5.

The first filter time constant $k_r$ may be determined from a reference filter time constant $k_{r\_ref}$ for a certain reference frame inter-arrival time $t_{ref}$ and then scaled for the actual frame inter-arrival time $t_{act}$. A frame may comprise a header and one or more data packets.

$$k_r = k_{r\_ref} * \frac{t_{act}}{t_{ref}}.$$

The reference jitter level $y_r$ should rise fast to the correct level at start of the session between the sending node 110 and the receiving node 130. This may be achieved by starting with an initial value of $k_r$, e.g. $k_r=1$ and decreasing the $k_r$ value stepwise from the initial value towards a final value that is small, e.g. approximately 0.001 as specified above, during e.g. 0.5-1.0 seconds, e.g. according to an exponential-like function.

The value of $y_r$ may according to some embodiments be frozen during a recognized congestion state to mitigate the impact of congestive peaks in the jitter on the reference jitter level $y_r$.

To estimate the congestion jitter level $y_g$, a second low-pass filter with a second filter time constant $k_g$ that is tuned according to the frequency $f_{high}$ may be used. The output signals $y_g[i]$ will then include the congestion related and non-congestion related low frequency jitter.

$$y_g[i]=y_g[i-1]+k_g*(y[i]-y_g[i-1]).$$

where $y[i]$ is the jitter or delay variation part of the time delay for packet number i, which is input to the second low-pass filter, $y_g[i-1]$ is the filter output for packet number i−1 and $y_g[i]$ is the filter output for packet number i. The second filter time constant $k_g$ is larger than the first filter time constant $k_r$.

The second filter time constant $k_g$ may be determined from a reference filter time constant $k_{g\_ref}$ for a certain reference frame inter-arrival time $t_{ref}$ and then scaled for the actual frame inter-arrival time $t_{act}$. A frame may comprise a header and one or more data packets.

$$k_g = k_{g\_ref} * \frac{t_{act}}{t_{ref}}.$$

After that the congestion jitter level $y_g$ and the reference jitter level $y_r$ have been estimated, the congestion state information of the communications network 120 may be determined by comparing the congestion jitter level $y_g$ to the reference jitter level $y_r$. Note that $k_g>k_r$. When the congestion jitter level $y_g$ is higher than or above the reference jitter level $y_r$ it may be determined that the communications network 120 is in a congestion state. The congestion state information may then indicate the congestion state. When the congestion jitter level $y_g$ is at or below, or lower than, the reference jitter level $y_r$ it may be determined that the communications network 120 is in a non-congestion state. The congestion state information may then indicate the non-congestion state.

if $(y_g>y_r)$ congestion state
else non-congestion state

In FIG. 4 it is further illustrated how the result of the comparison between the congestion jitter level $y_g$ and the reference jitter level $y_r$ can be used to control how fast an increase of the requested target rate 420 of an application can be performed after that congestion 410 has occurred in the communications network 120. During congestion state 410 the requested target rate is increased very slowly and when the congestion is over the rate is increased much faster, e.g. 5-15 times faster and preferably about 10 times faster.

Figure 5:
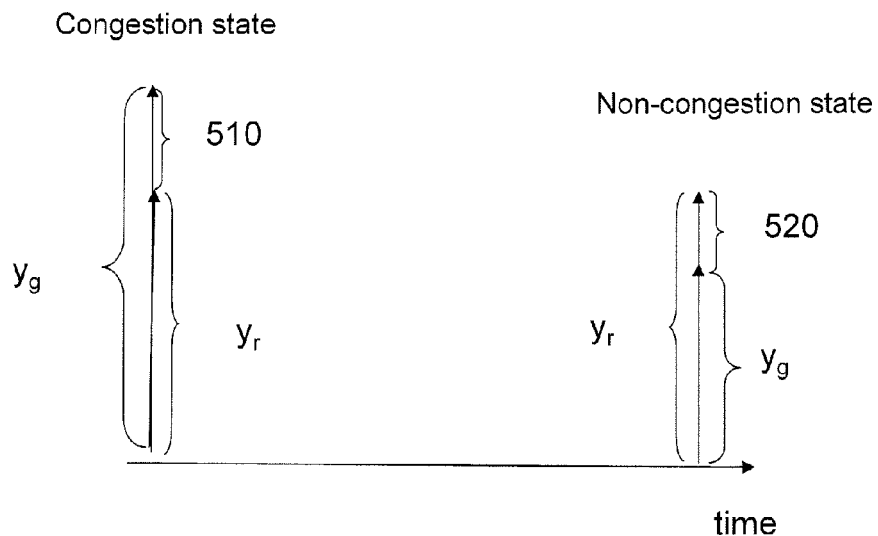
FIG. 5 is a diagram illustrating comparisons between a congestion jitter level $y_g$ and a reference jitter level $y_r$ for a congestion state and a non-congestion state respectively.

FIG. 5 shows an example of how an actual implementation of the congestion control algorithm may include hysteresis thresholds to improve the algorithm's robustness. In this example the congestion state information may be changed to indicate the congestion state when or only if the congestion jitter level $y_g$ is above the reference jitter level $y_r$ by at least a congestion delta value 510. Similarly, the congestion state information may be changed to indicate the non-congestion state when or only if the congestion jitter level $y_g$ is below the reference jitter level $y_r$ by at least a non-congestion delta value 520.

Figure 6:
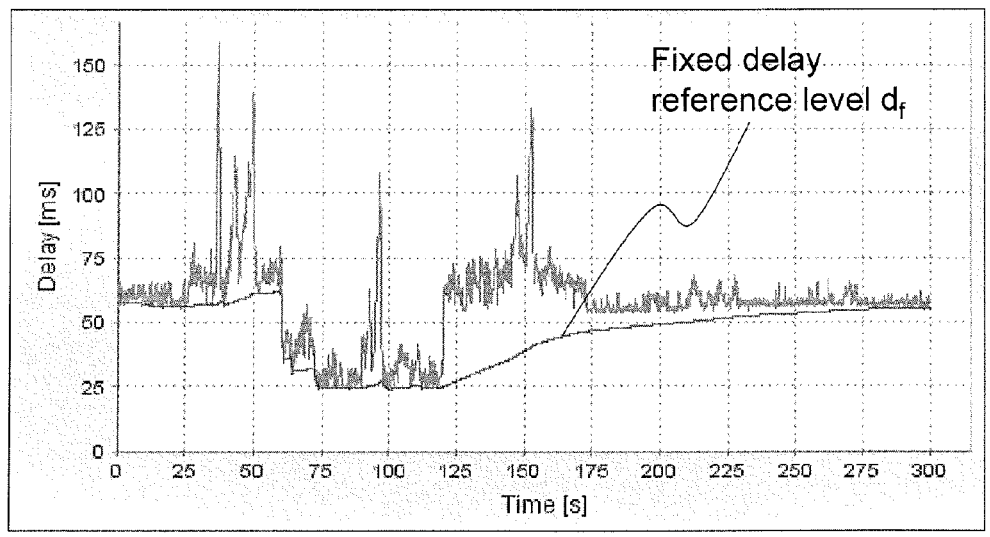
FIG. 6 is a diagram illustrating a fixed delay part of a jitter or delay variation in time delay of packets.

In the above examples, the congestion jitter level $y_g$ and the reference jitter level $y_r$ have been determined relative to a fixed delay reference level $d_f$. This approach may be advantageous in some embodiments as it eliminates impact from a possible fixed delay skew, i.e. slowly changing fixed delay value. In FIG. 6 an example of the fixed delay is illustrated. The fixed delay corresponds, as mentioned earlier, to a DC component of the time delay. The fixed delay varies generally very slowly, but it may jump up or down, for example at handover. If the link is over-loaded the increased target rate, which increase occurs due to a false too low jitter value, may lead to an excessive packet loss. To avoid packet loss due to a jump down of the fixed delay an asymmetrical low-pass filter may be used for separation or estimation of the fixed delay reference level $d_f$.

$$d_f[i]=d_f[i-1]+k_f*(d[i]-d_f[i-1]),$$

where $d[i]$ is the time delay for packet number i, which is input to the asymmetrical low-pass filter, df[i−1] is the filter output for packet number i−1 and df[i] is the filter output for packet number i. The adjustable filter time constant kf may be selected to have a first value when the time delay is decreasing and a second value when the time delay is increasing. The first value is larger than the second value. The first value may for example be a value between 0.4-0.6 and preferably about 0.5. The second value may for example be a value between 0.0005-0.0015 and preferably about 0.001. The above mentioned final value of the first filter time constant kr. may be set approximately equal to the second value of the adjustable filter time constant kf, i.e. $k_r \approx \min(k_f)$, and the first value of the adjustable filter time constant kf may for example be about 500 times larger than the second value.

A delay jump up does not cause any packet loss, but may lead to that an unnecessarily low target rate will be applied until the estimated fixed delay reference level reaches the new level. FIG. 6 presents how the asymmetric reference delay filter works: it follows a jump down fast but a jump up with a delay. The diagram shows two delay jumps, e.g. due to handovers: at t=60 s 30 ms down and at t=120 s 30 ms back up. As can be seen the jump down is almost perfect while the jump up happens with certain delay.

Figure 7:
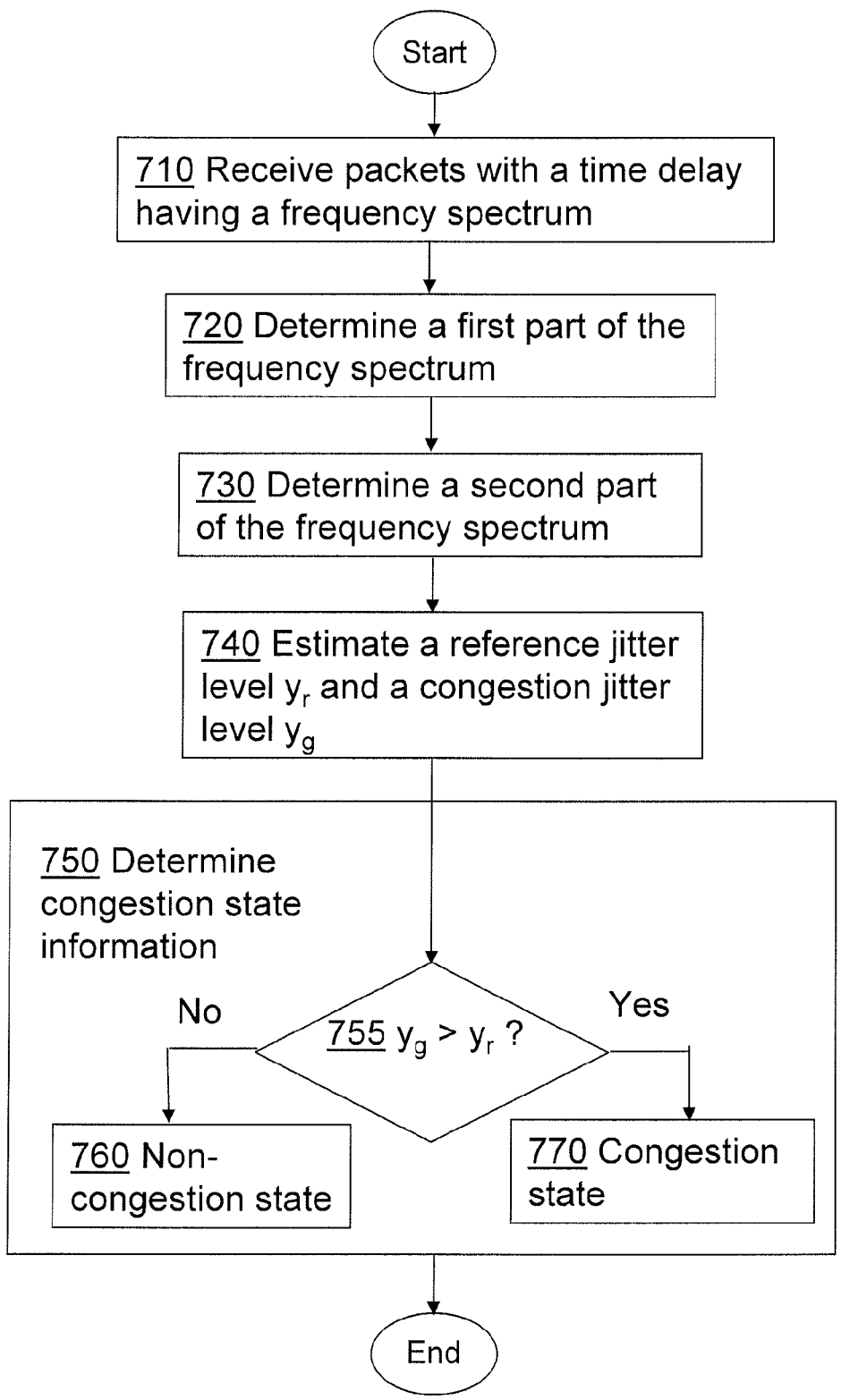
FIG. 7 is a flow chart illustrating a method according to some embodiments of the disclosure.

The method in the receiving node 130 for detecting congestion in the communications network 120 will now be described with reference to FIG. 7. The receiving node 130 is adapted to be connected to the communications network 120. The method comprises the following steps, which may be taken in any appropriate order:

Step 710. The receiving node 130 receives data packets from the sending node 110. The packets are transmitted in the session over the communications link 140 through the communications network 120. The data packets arrive at the receiving node 130 with a time delay. The time delay has a frequency spectrum 310 that is dependent on the load level 210 of the communications network 120.

Step 720. The receiving node 130 determines the first part 320 of the frequency spectrum 310. The first part 320 of the frequency spectrum 310 is limited upwards by the lower frequency limit $f_{low}$, so that the first part 320 of the frequency spectrum 310 comprises non-congestion related low frequency components but substantially no congestion related low frequency components.

Step 730. The receiving node 130 determines the second part 330 of the frequency spectrum 310. The second part 330 of the frequency spectrum 310 is limited upwards by the upper frequency limit $f_{high}$. When the load level 210 of the communications network 120 is below the threshold value 220, the second part 330 of the frequency spectrum 310 comprises non-congestion related low frequency components, but substantially no congestion related low frequency components. When the load level 210 of the communications network 120 is above the threshold value 220, the second part 330 of the frequency spectrum 310 comprises non-congestion related low frequency components and congestion related low frequency components.

Step 740. The receiving node 130 estimates the reference jitter level $y_r$ corresponding to the first part 320 of the frequency spectrum and the congestion jitter level $y_g$ corresponding to the second part 330 of the frequency spectrum 310. The estimations of the reference jitter level $y_r$ and the congestion jitter level $y_g$ may be performed by filtering the time delay. The fixed delay reference level $d_f$ that corresponds to the zero-frequency component of the frequency spectrum 310 may, according to some embodiments, also be estimated. The reference jitter level $y_r$ and the congestion jitter level $y_g$ may then be estimated relative to the fixed delay reference level $d_f$. Additionally or alternatively to estimating the reference jitter level $y_r$ and the congestion jitter level $y_g$ by filtering the time delay, the estimations of the reference jitter level $y_r$ and the congestion jitter level $y_g$ may then be performed by filtering a delay variation 430 that is formed by subtracting the fixed delay reference level $d_f$ from the time delay.

Step 750. The receiving node 130 determines congestion state information of said communications network 120. The congestion state information is determined by comparing the congestion jitter level $y_g$ to the reference jitter level $y_r$. Depending on the result of the comparison, the method continues at step 760 or step 770.

Step 760. The receiving node 130 may according to some embodiments determine that the communications network 120 is in the non-congestion state when the congestion jitter level $y_g$ is at or below the reference jitter level $y_r$. In some examples, the congestion state information is changed to indicate the non-congestion state when or only if the congestion jitter level $y_g$ is below the reference jitter level $y_r$ by at least a non-congestion delta value 520.

Step 770. The receiving node 130 may according to further embodiments determine that the communications network 120 is in the congestion state when the congestion jitter level $y_g$ is above the reference jitter level $y_r$. In some examples, the congestion state information is changed to indicate the congestion state when or only if the congestion jitter level $y_g$ is above the reference jitter level $y_r$ by at least a congestion delta value 510.

Figure 8:
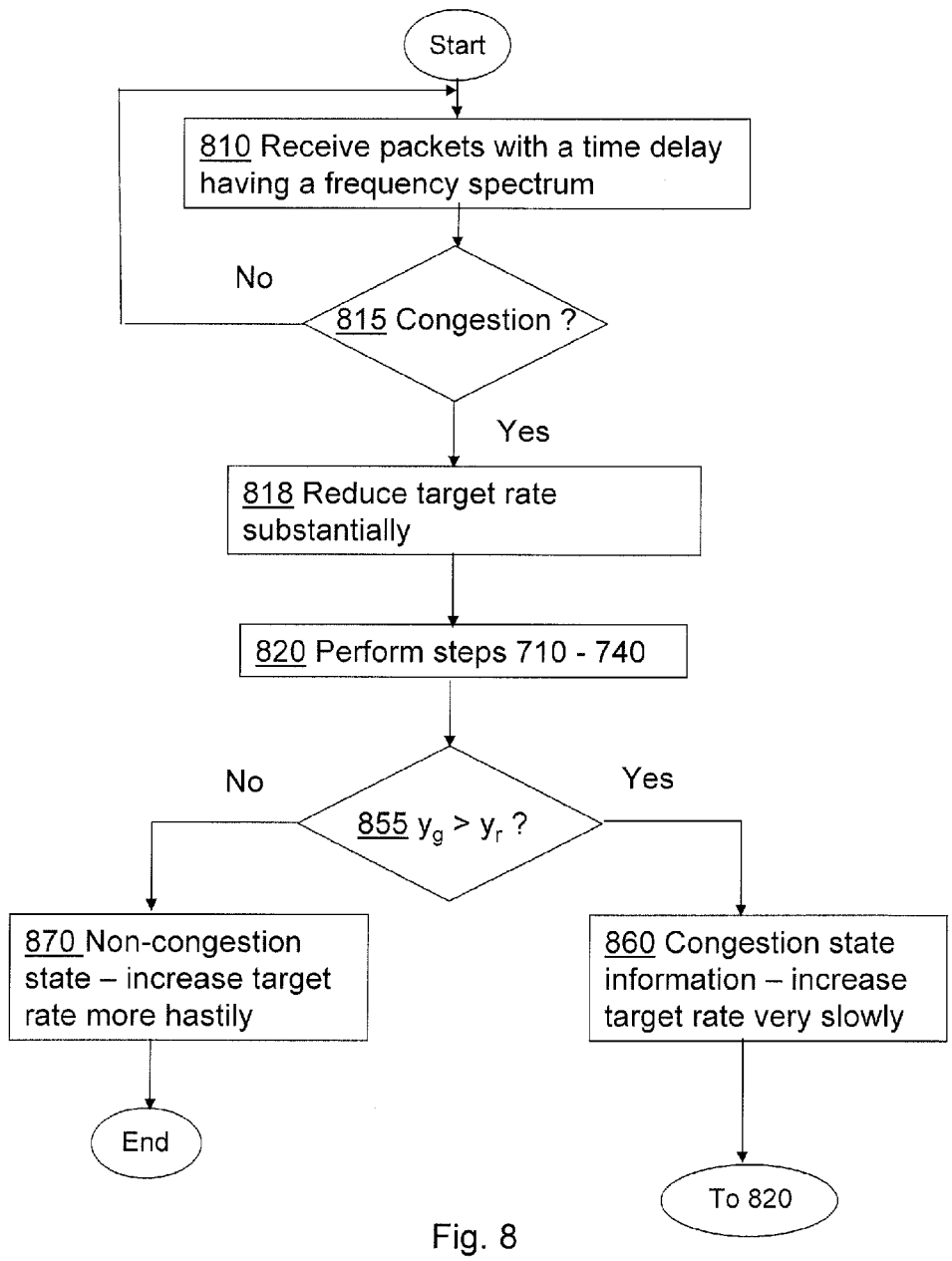
FIG. 8 is a flow chart illustrating a method according to an embodiment of the disclosure.

The method for detecting congestion described in connection to FIG. 7 above may further be applied in a jitter based congestion control mechanism. In this example, which will now be described with reference to FIG. 8, a real-time media application is running in the session. The data packets received by the receiving node 130 pertain to the real-time media application. FIG. 8 depicts the steps of a method for controlling rate adaptation of the real-time media application at congestion. The congestion state information may in this example be used for controlling how fast an increase of the requested target rate, which is signalled to the sending node 110, is performed in the session after that the session has experienced a rate reduction due to congestion in the communications network 120. The increase of the requested target rate in the session switches from a first increase rate to a second increase rate when the congestion state information switches from indicating the congestion state to indicating the non-congestion state. The method comprises the following steps, which may be taken in any appropriate order:

Step 810. The receiving node 130 receives data packets from the sending node 110. The packets are transmitted by the sending node 110 while applying a current target rate in the session. The session has previously been set up over the communications link 140 through the communications network 120. The data packets arrive at the receiving node 130 with a time delay. The time delay has a frequency spectrum 310 that is dependent on the load level 210 of the communications network 120.

Step 815. The receiving node 130 checks if congestion has been detected. The receiving node may be notified of the congestion by a network node where the congestion occurs, for example in an ECN message in the IP header of the packets. Alternatively or additionally, it may be detected by the receiving node 130 itself, for example using a jitter based congestion control mechanism such as the one described in this disclosure. If no congestion has been detected, the receiving node continues to receive data packets that are transmitted at the current target rate at step 810. However, if congestion is detected, the method continues at step 818.

Step 818. The receiving node 130 sends a feedback signal to the sending node 110 with a requested target rate that is substantially lower than the current target rate applied by the sending node 110. Depending on a number of parameters or aspects such as the severity of the congestion, the type of application and/or how close the current target rate is to a maximum target rate, the requested target rate may be between 25-75% of the current rate and in many applications 50% of the current target rate.

Step 820. The receiving node 130 continues to receive data packets as described in step 710 above, now transmitted by the sending node 110 while applying a reduced target rate in the session. The receiving node further estimates the reference jitter level $y_r$ and the congestion jitter level $y_g$, as described in steps 720-740 above.

Step 855. The receiving node 130 determines congestion state information of said communications network 120. The congestion state information is determined by comparing the congestion jitter level $y_g$ to the reference jitter level $y_r$. Depending on the result of the comparison, the method continues at step 860 or step 870.

Step 860. The receiving node 130 determines that the communications network 120 is in the congestion state when the congestion jitter level $y_g$ is above the reference jitter level $y_r$. In some examples, the congestion state information is changed to indicate the congestion state when or only if the congestion jitter level $y_g$ is above the reference jitter level $y_r$ by at least a congestion delta value 510.

For as long as the congestion state information indicates that the communications network 120 is in the congestion state, the receiving node 130 increases the requested target rate, that is sent in the feedback signal to the sending node 110, slowly at the first increase rate. The first increase rate may be a fixed rate or an adaptive rate. From this step, the method continues at step 820.

Step 870. The receiving node 130 determines that the communications network 120 is in the non-congestion state when the congestion jitter level $y_g$ is at or below the reference jitter level $y_r$. In some examples, the congestion state information is changed to indicate the non-congestion state when or only if the congestion jitter level $y_g$ is below the reference jitter level $y_r$ by at least a non-congestion delta value 520.

When the congestion state information changes to indicate that the communications network is in the non-congestion state, the receiving node 130 switches from increasing the requested target rate at the first increase rate to increasing the requested target rate faster at the second increase rate. The second increase rate is higher than the first increase rate. For example, the second increase rate may be 5-15 times higher, and preferably about 10 times higher than the first increase rate. The second increase rate may be a fixed rate or an adaptive rate.

Figure 9:
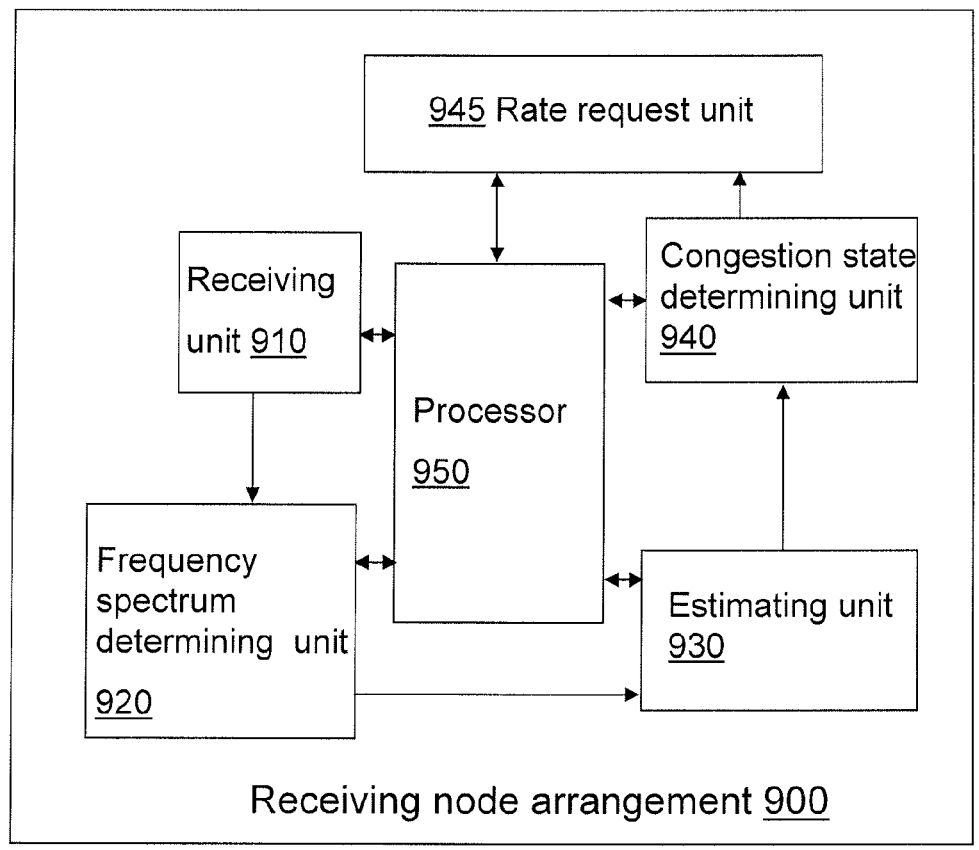
FIG. 9 is a schematic block diagram illustrating an arrangement in a receiving node.

To perform the method steps of the above methods for detecting congestion and/or for controlling rate adaptation at congestion, the receiving node 130 comprises an arrangement 900 depicted in FIG. 9. The arrangement 900 is adapted to detect congestion in the communications network 120 and the receiving node 130 is adapted to be connected to the communications network 120.

The arrangement 900 comprises a receiving unit 910 that is adapted to receive data packets from the sending node 110 in the session over the communications link 140 through the communications network 120. The data packets arrive at the receiving node 130 with a time delay. The time delay has a frequency spectrum 310 that is dependent on a load level 210 of the communications network 120.

The arrangement 900 further comprises a frequency spectrum determining unit 920 that is connected to the receiving unit 910 and adapted to determine the first part 320 of the frequency spectrum 310. The first part 320 of the frequency spectrum 310 is limited upwards by the lower frequency limit $f_{low}$, so that the first part 320 of the frequency spectrum 310 comprises non-congestion related low frequency components but substantially no congestion related low frequency components.

The frequency spectrum determining unit 920 is further adapted to determine the second part 330 of the frequency spectrum 310. The second part 330 of the frequency spectrum 310 is limited upwards by the upper frequency limit $f_{high}$. When the load level 210 of the communications network 120 is below the threshold value 220, the second part 330 of the frequency spectrum 310 comprises non-congestion related low frequency components, but substantially no congestion related low frequency components. When the load level 210 of the communications network 120 is above the threshold value 220, the second part 330 of the frequency spectrum 310 comprises non-congestion related low frequency components and congestion related low frequency components.

The arrangement 900 further comprises an estimating unit 930 that is connected to the frequency spectrum determining unit 920 and adapted to estimate the reference jitter level $y_r$ corresponding to the first part 320 of the frequency spectrum 310 and the congestion jitter level $y_g$ corresponding to the second part 330 of the frequency spectrum 310. The estimating unit 930 may further be adapted to perform the estimations of the reference jitter level $y_r$ and the congestion jitter level $y_g$ by filtering the time delay. According to some embodiments the estimating unit 930 may be adapted to also estimate the fixed delay reference level $d_f$ that corresponds to the zero-frequency component of the frequency spectrum 310. The estimating unit 930 may then be adapted to estimate the reference jitter level $y_r$ and the congestion jitter level $y_g$ relative to the fixed delay reference level $d_f$. Additionally or alternatively to being adapted to estimate the reference jitter level $y_r$ and the congestion jitter level $y_g$ by filtering the time delay, the estimating unit 930 may then be adapted to estimate the reference jitter level $y_r$ and the congestion jitter level $y_g$ by filtering a delay variation 430 that is formed by subtracting the fixed delay reference level $d_f$ from the time delay.

The arrangement 900 further comprises a congestion state determining unit 940 that is connected to the frequency spectrum determining unit 920 and adapted to determine congestion state information of said communications network 120 by comparison of the congestion jitter level $y_g$ to the reference jitter level $y_r$.

The congestion state determining unit 940 may according to some embodiments be adapted to determine that the communications network 120 is in the non-congestion state when the congestion jitter level $y_g$ is at or below the reference jitter level $y_r$. In some examples, the congestion state determining unit 940 may be adapted to change the congestion state information to indicate the non-congestion state when or only if the congestion jitter level $y_g$ is below the reference jitter level $y_r$ by at least a non-congestion delta value 520.

The congestion state determining unit 940 may according to further embodiments be adapted to determine that the communications network 120 is in the congestion state when the congestion jitter level $y_g$ is above the reference jitter level $y_r$. In some examples, the congestion state determining unit 940 may be adapted to change the congestion state information to indicate the congestion state when or only if the congestion jitter level $y_g$ is above the reference jitter level $y_r$ by at least a congestion delta value 510.

To perform the method steps of the above and in FIG. 8 described method for controlling rate adaptation at congestion for a real-time media application that is running in the session, the arrangement 900 may further comprise a rate request unit 945 that is connected to the congestion state determining unit 940. The rate request unit 945 is adapted to send a requested target rate in a feedback signal to the sending node 110 in response to data packets received in the session running the real-time media application. The packets are transmitted by the sending node 110 while applying a current target rate in the session. The session has previously been set up over the communications link 140 through the communications network 120.

The rate request unit 945 is further adapted to send a requested target rate that is substantially lower than the current target rate applied by the sending node 110 in the feedback signal when congestion has been detected. Depending on a number of parameters or aspects such as the severity of the congestion, the type of application and/or how close the current target rate is to a maximum target rate, the requested target rate may be between 25-75% of the current rate and in many applications 50% of the current target rate.

The rate request unit 945 is further adapted to use the congestion state information to control how fast an increase of the requested target rate, which is signalled to the sending node 110, is performed in the session after that the session has experienced a rate reduction due to congestion in the communications network 120.

For as long as the congestion state information indicates that the communications network 120 is in the congestion state, the rate request unit 945 is adapted to increase the requested target rate slowly at a first increase rate. The first increase rate may be a fixed rate or an adaptive rate.

When the congestion state information changes to indicate that the communications network is in the non-congestion state, the rate request unit 945 is adapted to switch from increasing the requested target rate at the first increase rate to increasing the requested target rate faster at the second increase rate. The second increase rate is higher than the first increase rate. For example, the second increase rate may be 5-15 times higher, and preferably about 10 times higher than the first increase rate. The second increase rate may be a fixed rate or an adaptive rate.

The present mechanism for detecting congestion and/or for controlling rate adaptation at congestion may be implemented through one or more processors, such as the processor 950 in the receiving node arrangement 900 depicted in FIG. 9, together with computer program code for performing the functions of the present solution. The program code mentioned above may also be provided as a computer program product, for instance in the form of a data carrier carrying computer program code for performing the present solution when being loaded into the receiving node 130. One such carrier may be in the form of a CD ROM disc. It is however feasible with other data carriers such as a memory stick. The computer program code can furthermore be provided as pure program code on a server and downloaded to the receiving node 130 remotely.

When using the word "comprise" or "comprising" it shall be interpreted as non-limiting, i.e. meaning "consist at least of".

The present invention is not limited to the above-describe preferred embodiments. Various alternatives, modifications and equivalents may be used. Therefore, the above embodiments should not be taken as limiting the scope of the invention, which is defined by the appending claims.

The invention claimed is:

1. A method in a receiving node for detecting congestion in a communications network to which the receiving node is connected, the method comprising:
    receiving data packets from a sending node through the communications network over a communications link in a session, which data packets arrive at the receiving node with a time delay, which time delay has a frequency spectrum that is dependent on a load level of the communications network;
    determining a first part of the frequency spectrum that is limited upwards by a lower frequency limit, so that the first part of the frequency spectrum comprises non-congestion related low frequency components but substantially no congestion related low frequency components;
    determining a second part of the frequency spectrum that is limited upwards by an upper frequency limit, so that, when the load level of the communications network is below a threshold value, the second part of the frequency spectrum comprises non-congestion related low frequency components, but substantially no congestion related low frequency components and so that, when the load level of the communications network is above the threshold value, the second part of the frequency spectrum comprises non-congestion related low frequency components and congestion related low frequency components;
    estimating a reference jitter level corresponding to the first part of the frequency spectrum and a congestion jitter level corresponding to the second part of the frequency spectrum; and
    determining congestion state information of said communications network by comparing said congestion jitter level to said reference jitter level.

2. The method according to claim 1, wherein determining the congestion state information comprises determining that the communications network is in a congestion state when the congestion jitter level is above the reference jitter level.

3. The method according to claim 1, wherein determining the congestion state information comprises determining that the communications network is in a congestion state when the congestion jitter level is above the reference jitter level by at least a congestion delta value.

4. The method according to claim 1, wherein determining the congestion state information comprises determining that the communications network is in a non-congestion state when the congestion jitter level is at or below the reference jitter level.

5. The method according to claim 1, wherein determining the congestion state information comprises determining that the communications network is in a congestion state when the congestion jitter level is below the reference jitter level by at least a congestion delta value.

6. The method according to claim 1, wherein estimating the reference and congestion jitter levels includes filtering the time delays of the received data packets.

7. The method according to claim 1, further comprising estimating a fixed delay reference level, wherein the fixed delay corresponds to a zero-frequency component of the frequency spectrum, and wherein the reference jitter level and the congestion jitter level are estimated relative to the fixed delay reference level.

8. The method according to claim 7, further comprising estimating the fixed delay reference level using an asymmetrical low-pass filter having an adjustable filter time constant.

9. The method according to claim 7, further comprising forming a delay variation by subtracting the fixed delay reference level from the time delay, and estimating the reference jitter level by low-pass filtering the delay variation using a first filter time constant that is tuned to the lower frequency limit.

10. The method according to claim 9, wherein the reference jitter level is estimated by using a symmetric single pole recursive filter, tuned according to the first filter time constant, and multiplying an output of the symmetric single pole recursive filter by a coefficient.

11. The method according to claim 9, wherein the congestion jitter level is estimated by low-pass filtering the delay variation using a second filter time constant that is tuned to the upper frequency limit.

12. The method according to claim 9, wherein the congestion jitter level is estimated by band-pass filtering the delay variation using a second filter time constant that is tuned to the upper frequency limit and a further filter time constant that is tuned to the lower frequency limit.

13. The method according to claim 1, further comprising applying the method as part of a jitter based congestion control mechanism.

14. The method according to claim 1, wherein a real-time media application is running in the session, and wherein the data packets pertain to the real-time media application.

15. The method according to claim 1, further comprising using the congestion state information to control how fast an increase of a requested target rate is performed in the session after the session has experienced a rate reduction due to congestion in the communications network.

16. The method according to claim 15, wherein controlling how fast an increase of a requested target rate is performed in the session after the session has experienced a rate reduction due to congestion in the communications network comprises switching the increase of the requested target rate in the session from a first increase rate to a second increase rate when the congestion state information switches from indicating the congestion state to indicating the non-congestion state.

17. A receiving node that is connected to a communications network and adapted to detect congestion in the communications network, said receiving node comprising:
- a receiving unit adapted to receive data packets from a sending node through the communications network over a communications link in a session, wherein the data packets arrive at the receiving node with a time delay, wherein the time delay has a frequency spectrum that is dependent on a load level of the communications network;
- a frequency spectrum determining unit connected to said receiving unit and adapted to determine a first part of the frequency spectrum that is limited upwards by a lower frequency limit, wherein the first part of the frequency spectrum comprises non-congestion related low frequency components but substantially no congestion related low frequency components;
- the frequency spectrum determining unit further adapted to determine a second part of the frequency spectrum that is limited upwards by an upper frequency limit so that, when the load level of the communications network is below a threshold value, the second part of the frequency spectrum comprises non-congestion related low frequency components, but substantially no congestion related low frequency components and so that, when the load level of the communications network is above the threshold value, the second part of the frequency spectrum comprises non-congestion related low frequency components and congestion related low frequency components;
- an estimating unit connected to the frequency spectrum determining unit and adapted to estimate a reference jitter level corresponding to the first part of the frequency spectrum and a congestion jitter level corresponding to the second part of the frequency spectrum; and
- a congestion state determining unit connected to the frequency spectrum determining unit and adapted to determine congestion state information of said communications network by comparison of said congestion jitter level to said reference jitter level.

18. A method in a receiving node comprising:
estimating time delays of data packets received at the receiving node, as sent through a communications network by a sending node;
determining a frequency spectrum of jitter in the time delays;
estimating a reference jitter level from a first part of the frequency spectrum that includes frequency components arising from non-congestion related jitter and substantially excludes frequency components arising from congestion-related jitter;
estimating a congestion jitter level from a second part of the frequency spectrum that depends on frequency components arising from non-congestion related jitter and, when a load level of the communications network is above a threshold value, further depends on frequency components arising from congestion-related jitter; and
determining congestion state information for the communications network as a function of the reference jitter level and the congestion jitter level.

* * * * *